US006772680B1

(12) United States Patent
Quantz et al.

(10) Patent No.: US 6,772,680 B1
(45) Date of Patent: Aug. 10, 2004

(54) HIGH PRODUCTION NUTCRACKING APPARATUS WITH SEALED LUBRICATION SYSTEM

(75) Inventors: James B. Quantz, Lexington, SC (US); Pascal W. Pitts, Cayce, SC (US); John L. Feaster, Columbia, SC (US)

(73) Assignee: Machine Design Incorporated, West Columbia, SC (US)

( * ) Notice: Subject to any disclaimer, the term of this patent is extended or adjusted under 35 U.S.C. 154(b) by 0 days.

(21) Appl. No.: 10/715,194

(22) Filed: Nov. 17, 2003

(51) Int. Cl.[7] ............................ A23N 5/00; A23L 1/00
(52) U.S. Cl. ............................ 99/571; 99/574; 99/581
(58) Field of Search .................... 99/568, 571–576, 99/577–579, 580–583, 600, 570; 426/481, 632, 482, 634; 30/120.1–120.5; 198/622

(56) References Cited

U.S. PATENT DOCUMENTS

| | | | |
|---|---|---|---|
| 4,332,827 A | 6/1982 | Quantz | |
| 4,418,617 A | 12/1983 | Quantz | |
| 4,441,414 A | 4/1984 | Quantz | |
| 5,247,879 A | * 9/1993 | Frederiksen et al. | 99/575 |
| 5,325,769 A | * 7/1994 | Filice et al. | 99/571 |
| 5,511,470 A | * 4/1996 | Lemos | 99/571 |
| 5,623,867 A | 4/1997 | Quantz | |
| 5,711,213 A | * 1/1998 | Thomson | 99/571 |
| 6,182,562 B1 | 2/2001 | Quantz et al. | |
| 6,205,915 B1 | 3/2001 | Quantz | |
| 6,270,824 B1 | 8/2001 | Quantz | |
| 6,584,890 B1 | 7/2003 | Quantz et al. | |
| 6,588,328 B1 | 7/2003 | Quantz et al. | |

* cited by examiner

Primary Examiner—Timothy F. Simone
(74) Attorney, Agent, or Firm—Alston & Bird LLP

(57) ABSTRACT

A sealed lubrication system for a high production nutcracking apparatus of the type comprising a plurality of cracking units mounted on a rotatable turret. The cracking units are operated by pressurized air during rotation of the turret, and the pressurized air includes an oil mist component to reduce friction and wear. The oil is recovered by a system which includes an essentially closed annular collection chamber which surrounds the turret and which leads to a drain and an oil tank, and the oil tank is divided by a porous baffle plate which serves to remove and collect the entrained oil before the air is released to the atmosphere.

14 Claims, 4 Drawing Sheets

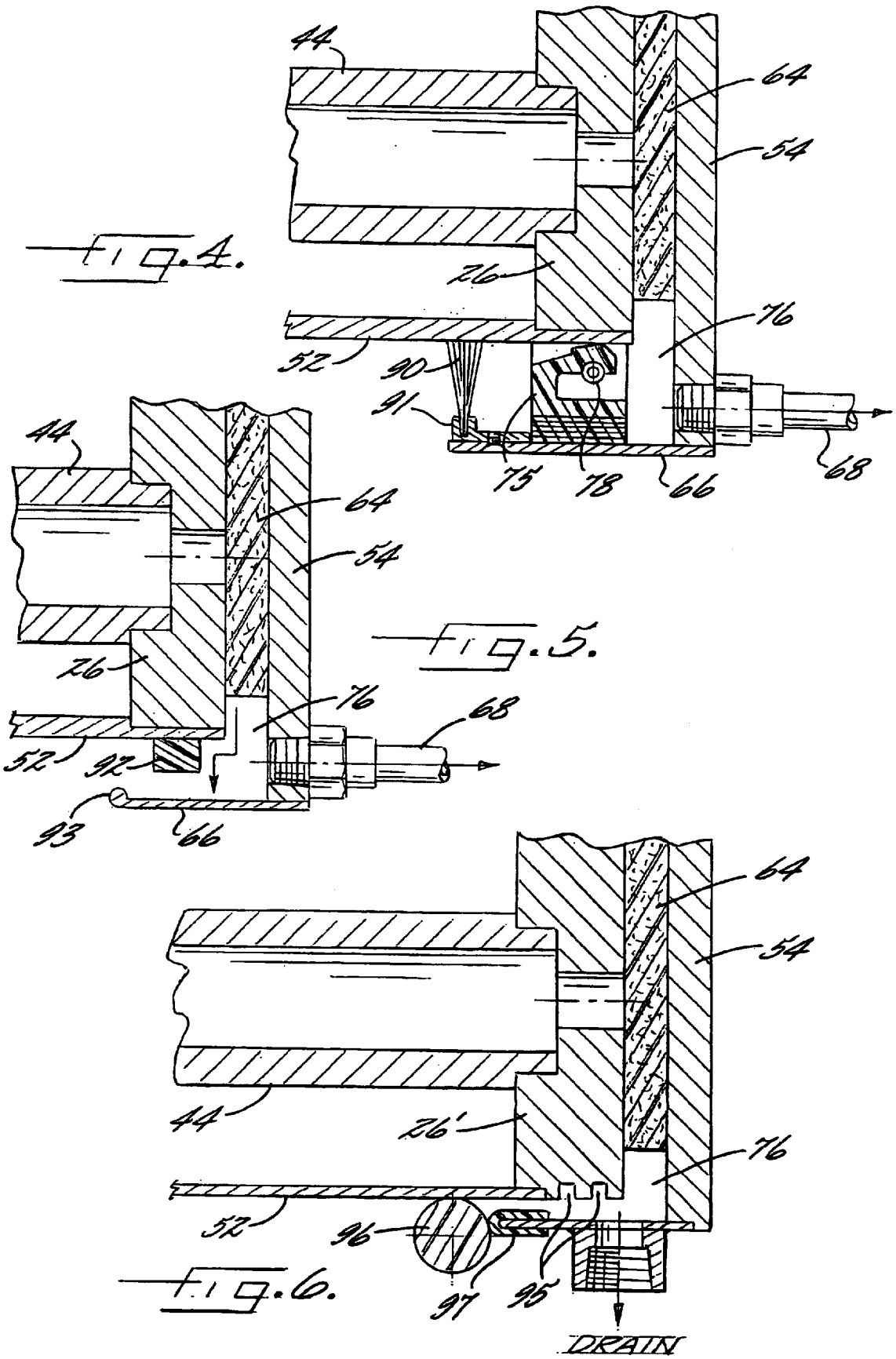

HIGH PRODUCTION NUTCRACKING APPARATUS WITH SEALED LUBRICATION SYSTEM

BACKGROUND OF THE INVENTION

The present invention relates to an improved high production nutcracking apparatus, of the type disclosed for example in U.S. Pat. Nos. 4,332,827; 5,623,867; 6,205,915; and 6,584,890.

The nutcracking apparatus as disclosed in the above patents includes a rotatable turret which mounts a plurality of cracking units arranged about its periphery, with each cracking unit having an opening adapted to receive an individual nut from a nut feed conveyor which comprises a plurality of nut transport elements mounted in succession on a feed chain. Each of the nut transport elements includes an upwardly open transverse receptacle for holding an individual nut, and each cracking unit on the turret has an anvil which is moved axially into the receptacle at a pickup point so that the nut is engaged between the anvil and a crack die on the other side of the opening.

In operation, the feed conveyor moves tangentally past the rotating turret so that the anvils of the cracking units enter the receptacles of respective nut transport elements at the pickup point and engage and pick up the nut. After the cracking unit and engaged nut have moved away from the pickup point, the crack die of the cracking unit in impacted by a shuttle so that the crack die applies an impact to the nut to crack the shell.

The control system for cyclically actuating the cracking units includes an air control system whereby air is selectively introduced into four ports of each cracking unit. Also, as indicated in U.S. Pat. No. 4,332,827, it is conventional to place an air oiler and a filter in the air supply manifold line, to lubricate the moving components of the cracking units. While such lubrication minimizes wear, it can cause environmental concerns resulting from the escape of oil, either as a liquid which drips to the floor or as an oil mist which enters the surrounding atmosphere.

It is an object of the present invention to provide a lubrication system for a high speed nutcracking apparatus of the described type, and which is substantially sealed so as to minimize the escape of the oil, either as a liquid or in the form of an oil mist.

SUMMARY OF THE INVENTION

The above and other objects and advantages of the invention are achieved by the provision of an essentially closed lubrication system which incorporates an oil recovery system for recovering oil from the air/oil mixture after it has been delivered to and exhausted from the cracking units. The recovery system includes a cowling sleeve attached to the valve plate of the turret so as to surround the radial periphery of the end plate and the filtering pad of the turret. The cowling sleeve has an annular free end remote from the valve plate and defines an annular collection chamber surrounding the periphery of the filtering pad and the end plate. Also, a drain communicates with the lower portion of the collection chamber, and an annular barrier member is provided for restricting the flow of oil which is received in the collection chamber in a direction toward said free end of the cowling sleeve and so that the oil is guided into the drain.

An oil tank is provided for receiving any oil exiting from the drain of the collection chamber and from an exhaust line which is connected to an opening of the valve plate which vents the air from the cracking units. Also, an oil recirculation system is provided for delivering oil from the tank to the air delivery system to form the oil mist component of the pressurized air delivered to the cracking units.

The oil tank has a first upper chamber communicating with the drain and with the exhaust line, a second upper chamber communicating with an outlet line, a lower oil delivery line communicating with the oil recirculation system, and a perforated baffle plate positioned to extend downwardly into oil in the tank and separating the first and second upper chambers from each other.

The turret further includes an axial support shaft extending along its rotational axis, with the shaft extending through aligned openings in each of the end plate, the felt pad, and the valve plate. A resilient sealing gasket is disposed between the shaft and each of the end plate and the valve plate.

BRIEF DESCRIPTION OF THE DRAWINGS

Some of the objects and advantages of the invention having been stated, others will appear as the description proceeds, when taken in connection with the accompanying drawings, in which:

FIGS. 4–6 are sectional views of three embodiments of the recovery system of the present invention.

DETAILED DESCRIPTION OF THE PREFERRED EMBODIMENT

Figure 1:
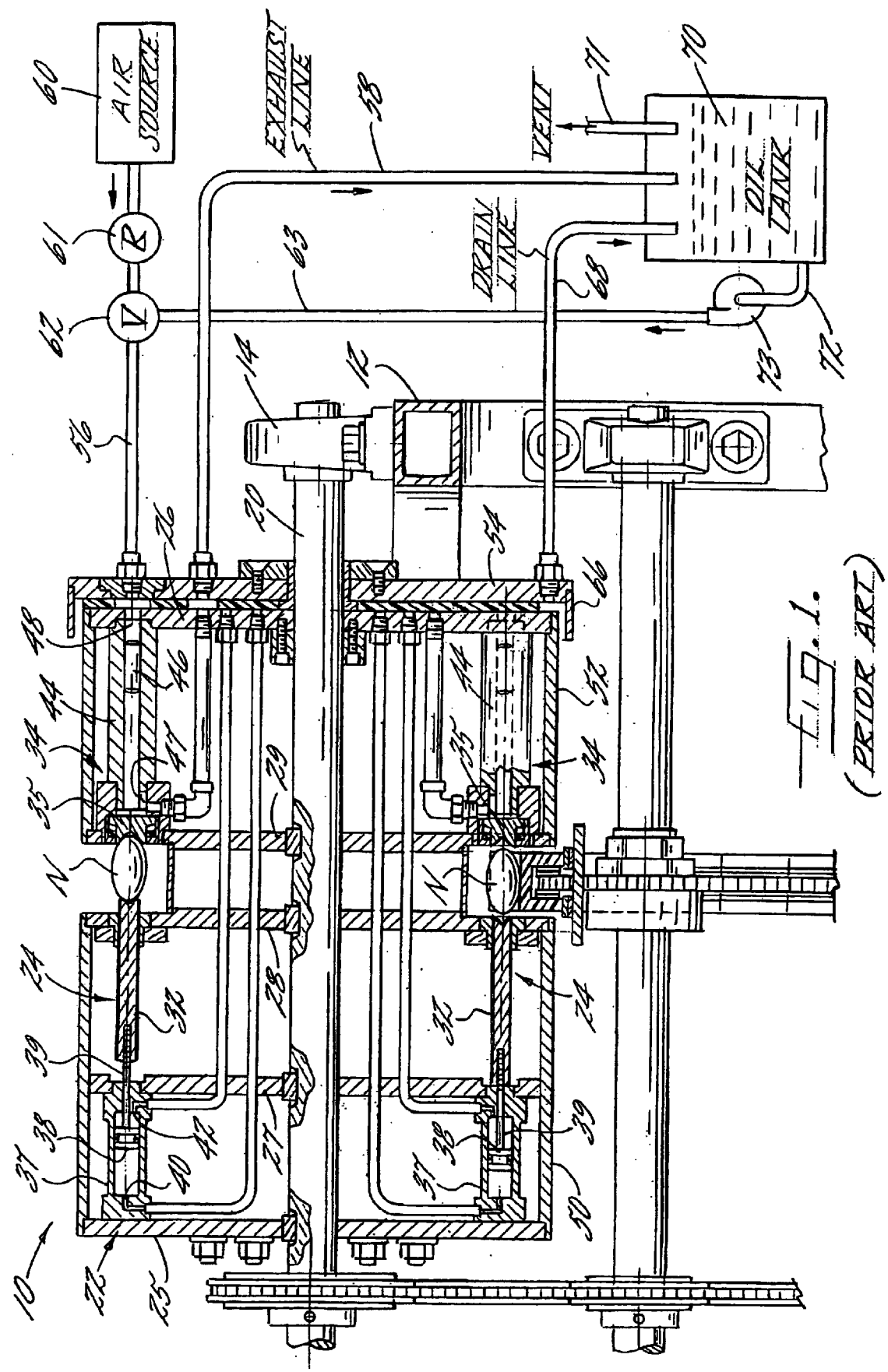
FIG. 1 is a partly sectioned side elevation view of a nutcracking apparatus of the described type and which embodies the prior art lubrication system.

Referring more specifically to the drawings, FIG. 1 illustrates in more detail a nut cracking apparatus of the prior art as generally described above. As illustrated, the prior apparatus is indicated by the numeral 10, and it includes a rectangular box-like frame 12 which supports a pair of bearing blocks 14 (only one being shown) which rotatably mount a central shaft 20 which defines a horizontal central axis.

A turret 22 is fixedly mounted to the shaft 20 so as to be rotatable with the shaft about the central axis. The turret 22 comprises a plurality of elongate cracking units 24 which are circularly arranged about the shaft and supported by the end plates 25 and 26, and the intermediate plates 27, 28 and 29. There are sixteen cracking units in the illustrated embodiment and the units extend generally parallel to each other and to the central axis.

Each of the cracking units 24 comprises an anvil 32, and a cracking die assembly 34 which includes a cracking die 35. The anvil and cracking die assembly are mounted in an axially aligned, opposed relationship to define an opening for receiving a nut N therebetween. More particularly, the means for mounting the anvil 32 includes a first air cylinder 37, a piston 38 slidably disposed within the cylinder 37, a piston rod 39 interconnecting the piston and anvil, a first air port 40 disposed adjacent the rearward end of the cylinder, and a second air port 42 disposed adjacent the forward end of the cylinder. As will be apparent, movement of the piston 38 results in a corresponding movement of the anvil 32, either forwardly toward the cracking die assembly 34 or rearwardly therefrom. Such movement is controlled by air which is selectively provided to the first and second ports 40, 42 in a manner more fully disclosed in U.S. Pat. Nos. 4,418,617; 4,441,414; and 6,182,562.

The cracking die assembly 34 is more fully described in the above referenced patents, the disclosures of which are all expressly incorporated herein by reference, and it includes the cracking die 35, and a second air cylinder 44. A free floating shuttle 46 is mounted so as to be closely received within the bore of the cylinder 44. In addition, there is provided an air port 47 adjacent the forward end of the cylinder and a further port 48 which extends axially through the rearward end of the cylinder.

The turret 22 further includes a cylindrical cover plate 50 which encloses the anvils 32 and first air cylinders 37, and a second cylindrical cover plate 52 which encloses cracking die assemblies 34 and second air cylinders 44.

The control system for cyclically actuating the cracking unit includes an air control system whereby air, which includes a lubricating oil mist, is selectively introduced into the four ports 40 42, 47, and 48. More particularly, upon receiving a nut N in the opening between the anvil 32 and cracking die assembly 34, air is first introduced into the port 40 so that the piston 38 and anvil 32 are moved forwardly and such that the anvil 32 operatively engages one end of the nut N in the opening. The nut thereby becomes supported between the anvil 32 and cracking die 35. The anvil 32 and cracking die 35 thereby also serve to compressively stress the retained nut. High pressure air is next injected through the port 48 and into the air cylinder 44, such that the shuttle 46 is thrust forwardly along the cylinder and impacts against the rear end surface of the cracking die 35, causing the cracking die to sharply advance a short distance forwardly against the nut and thereby crack its shell. The air in front of the advancing shuttle is permitted to exhaust through the port 47. Air next enters the port 42, causing the piston 38 and anvil 32 to move rearwardly and release the nut, and as a final step, air is caused to enter the port 47 and thereby return the shuttle 46 to its rearward position. The apparatus is then in position to receive another nut to be cracked, with the above cycle being cyclically repeated. Further details regarding the air control system for cyclically actuating the apparatus 10 may be obtained from the above noted prior patents.

The prior apparatus as shown in FIG. 1 further includes an apparatus for advancing and delivering a plurality of nuts individually in succession along a path of travel to the rotating turret 22. The nut delivering apparatus is not illustrated herein, but a complete disclosure thereof may be obtained from the above referenced patents, the disclosures of which are expressly incorporated herein by reference.

Figure 3:
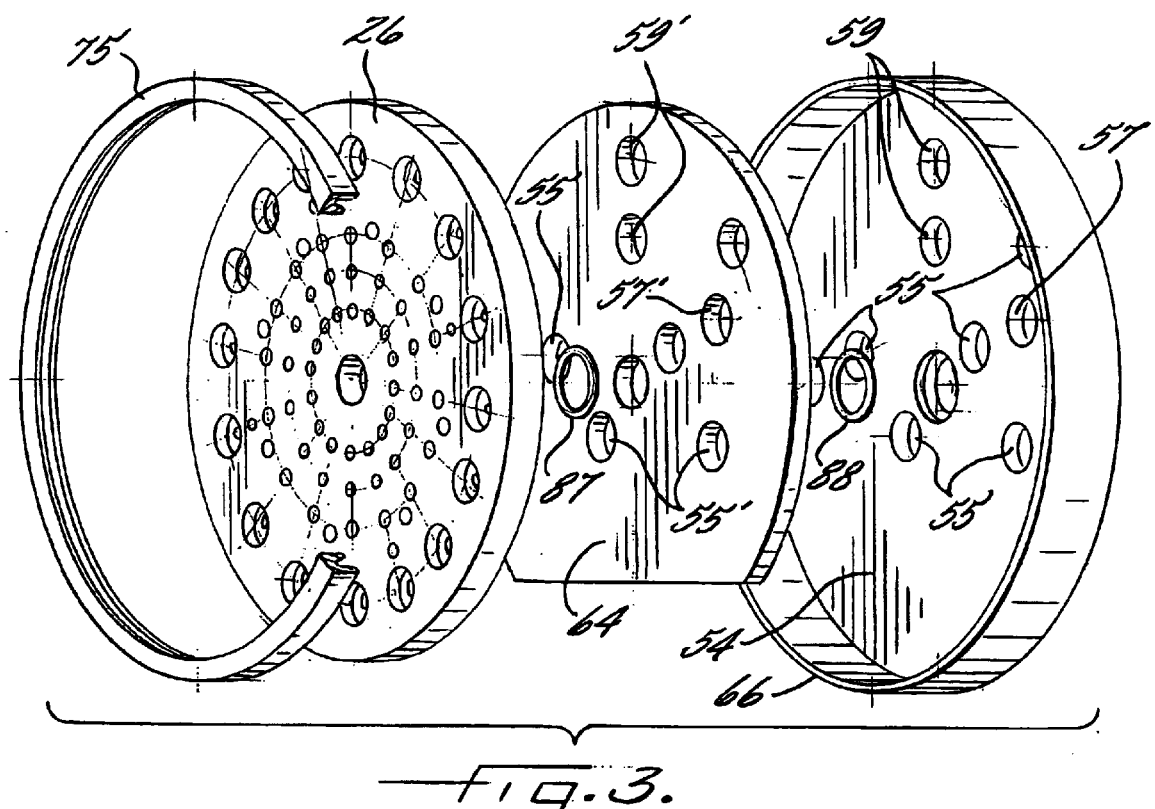
FIG. 3 is an expanded perspective view of the end plate, filtering pad, and valve plate of the turret of the present invention.

The ports 40, 42, 47 and 48 of the cracking units are each connected via an air line to one side of the end plate 26 and so as to communicate with respective openings which extend through the end plate, note FIG. 3.

A valve plate 54 is fixedly mounted to the machine frame so as to be positioned parallel to and spaced from the other side of the end plate 26, and the valve plate 54 includes a plurality of inlet openings 55 which are positioned for sequential alignment with selected ones of the openings in the end plate as the turret is rotated. The inlet openings each communicate with an air delivery line 56 on the side thereof opposite the end plate 26. The valve plate 54 further includes a single outlet opening 57 positioned for sequential alignment with each of the openings in the end plate 26 which are connected to the exhaust ports 47 of the air cylinders 44 as the turret is rotated. The outlet opening 57 in the valve plate 54 is connected to an exhaust line 58 on the side thereof opposite the end plate.

The valve plate 54 includes two service or inspection openings 59, 59', respectively, which form no part of the present invention.

An air delivery system is provided for delivering pressurized air which includes an oil mist component to each of the air delivery lines 56 such that the pressurized air/oil mist is selectively delivered to and exhausted from said cracking units during rotation of the turret. The air delivery system includes a pressurized air source 60 which delivers the air to a manifold and then to the individual air delivery lines 56 via a pressure regulator 61 and a metering valve 62 which slowly drips oil from an oil delivery line 63 into the air delivery line 56. The oil is thereby vaporized to form the air/oil mist which is delivered to the cracking units.

A filtering pad 64 is fixedly mounted in the space between the end plate 26 and the valve plate 54, with the filtering pad 64 having a plurality of inlet openings 55' aligned with respective ones of the inlet openings 55 in the valve plate 54, and an outlet opening 57' which is aligned with the outlet opening 57 in the valve plate 54. Thus when the high pressure air is injected into the air cylinder 44 to thrust the shuttle 46 forwardly, the air in front of the shuttle is free to move freely through the port 47 and the outlet opening 57 to the exhaust line 58. The pad 64 includes two service and inspection openings 59' which are aligned with the openings 59 in the valve plate 54. This condition is illustrated in FIG. 1.

As illustrated in connection with the lowermost cracking unit 24 shown in FIG. 1, the filtering pad 64 forms a filtering barrier which is aligned with the remainder of the openings in the end plate 26 when such openings receive exhausted air from the associated cracking unit. Thus the pad 64 tends to entrap and collect the oil which is entrained with the air as it exhausts through these openings.

The prior apparatus as illustrated in FIG. 1 includes an oil recovery system which includes a cowling sleeve 66 attached to the valve plate 54 so as to surround the radial periphery of the end plate 26 and the filtering pad 64. A drain extends through the lower portion of the valve plate 54 and communicates with a drain line 68 which is connected on the outer side of the valve plate 54. Thus the oil which is entrapped in the filtering pad 64 during operation of the machine tends to flow downwardly onto the cowling sleeve 66 and into the drain and the drain line 68.

The oil recovery system further includes an oil tank 70 into which the exhaust lines 58 and the drain line 68 empty. A vent 71 is provided in the upper chamber of the tank, and a lower output line 72 supplies oil to the line 63 and metering valve 62 via a pump 73 and filter.

As indicated above in the background section of the specification, the oil lubrication system of the prior apparatus is the subject of environmental concerns resulting from the escape of oil. In particular,.oil tends to collect and drip from the cowling sleeve 66, and oil which collects in the pad 64 tends to leak through the bearings of the shaft 20. Further, the air which passes outwardly from the tank via the vent 71 tends to entrain oil and form a mist which is vented to the atmosphere.

The above environmental concerns are effectively avoided with the apparatus of the present invention, which is illustrated in FIGS. 2–6. More particularly, and in accordance with the present invention, there is provided an improved oil recovery system which is essentially sealed against the loss of oil into the surrounding environment. In the embodiment shown in FIGS. 2 and 2A, the cowling sleeve 66 is mounted so as to be radially spaced a rather significant distance (typically about 1 inch) from the outer periphery of the end plate 26. Also, an annular barrier member, which is in the form of a resilient gasket 75, is mounted so as to be fixed on the inside of the cowling sleeve 66 and it is sized to bear against the outer periphery of the cover plate 52 or the end plate 26. Thus a closed collection chamber 76 is formed which surrounds the periphery of the filtering pad 64 and communicates with the drain. The oil which collects in the pad and drains downwardly onto the cowling sleeve 66 is thereby retained in the closed collection chamber 76 and passes out through the drain line 68.

The resilient gasket 75 comprises a closed annular ring of a suitable elastomeric material and in cross section it will be seen to have a base portion which may be reinforced with cords and a flexible upper leg which optionally can be biased toward the cover plate or end plate by an annular spring 78.

The annular gasket 75 acts to generally seal the collection chamber 76 to the passage of air and so that the chamber becomes somewhat pressurized by the air which enters and exhausts from the cracking units and then passes through the filtering pad 64 to the collection chamber. The pressurization of the chamber serves to force the oil which collects therein into and through the drain line 68.

Figure 2:
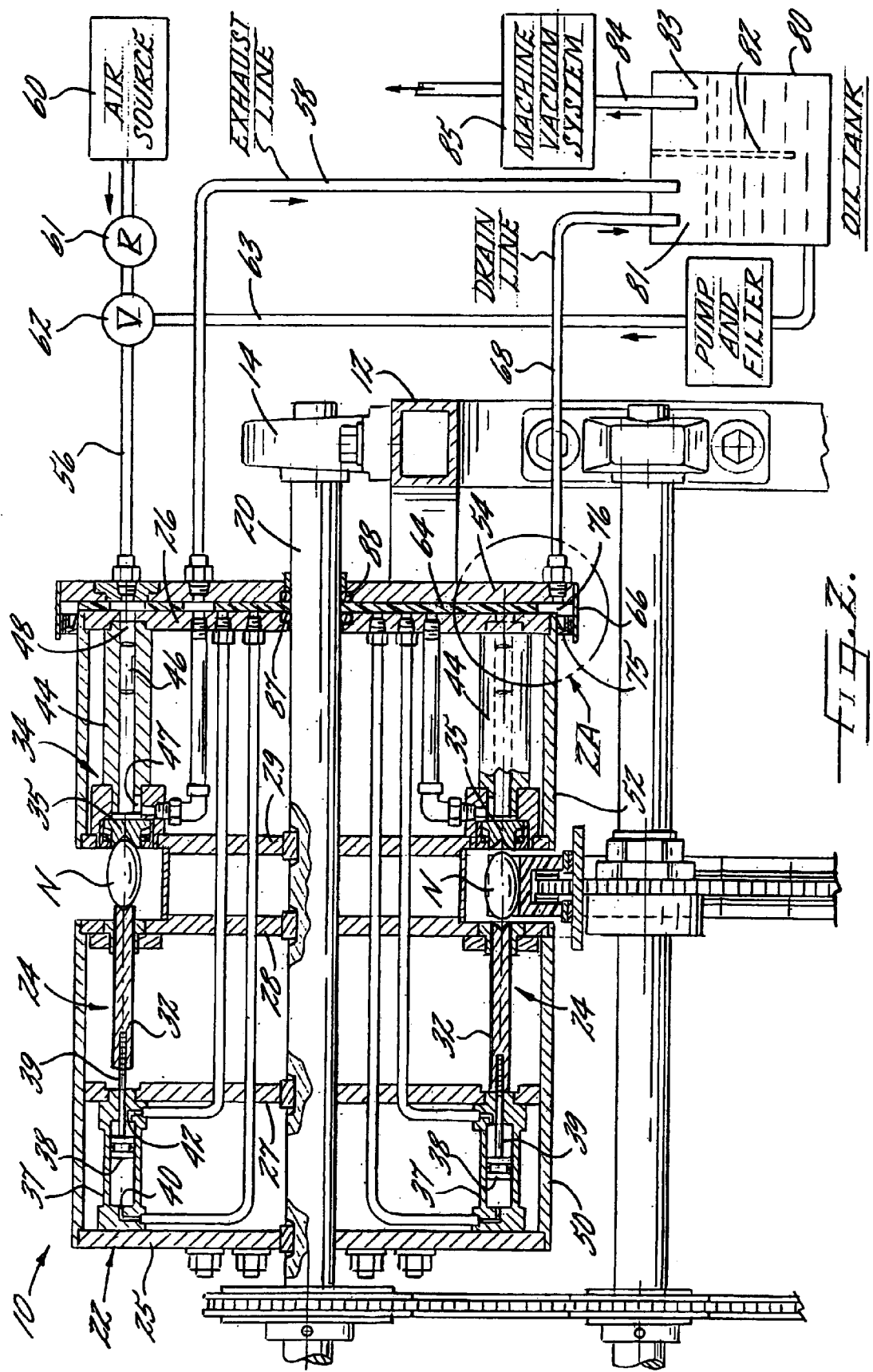
FIG. 2 is a view similar to FIG. 1 but illustrating the oil lubrication and recovery systems of the present invention.
Figure 2A:
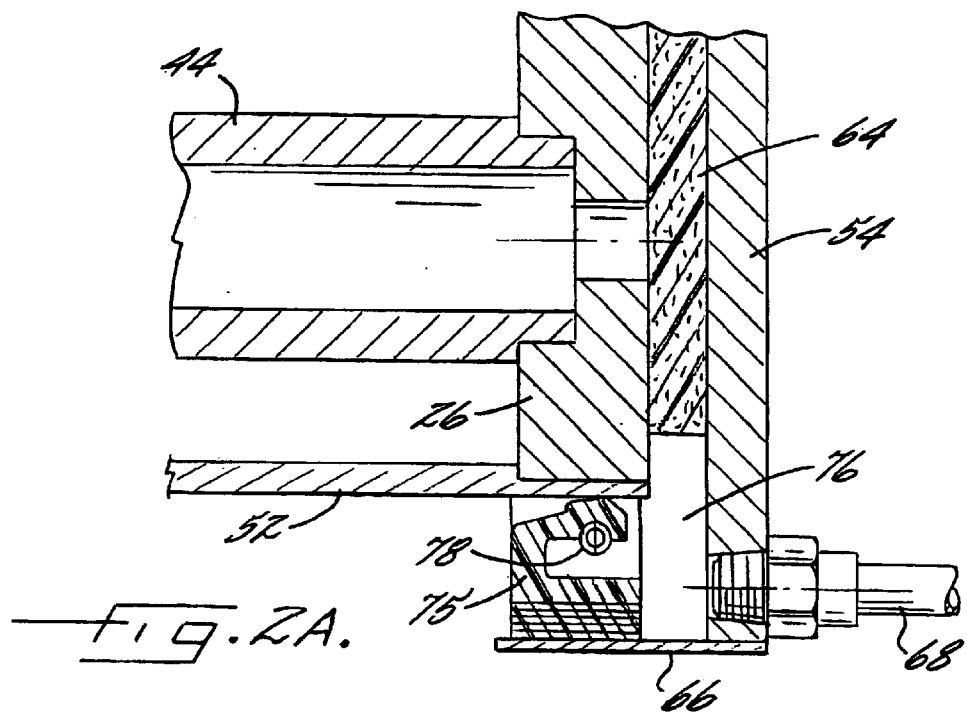
FIG. 2A is an enlargement of the portion shown within the circle 2A of FIG. 2.

As seen in FIG. 2, the drain line 68 communicates with a first upper chamber 81 of an oil tank 80, and the several exhaust lines 58 also communicate with the first upper chamber 81. The tank 80 includes an air porous baffle plate 82 which extends from the cover of the tank downwardly into the oil which is held in the tank. Also, the baffle plate 82 forms a second upper chamber 83 which communicates with an outlet 84 which leads to a vacuum air exhaust system 85 which is provided on the machine for removing air and entrained debris from the vicinity of the turret. A lower outlet 72 is also provided, which leads to the air supply manifold via a pump and filter 73. Thus the oil collected in the tank may be recirculated from the tank to the air delivery system to form the oil mist component of the pressurized air delivered to the cracking units.

The baffle plate 82 preferably comprises a metal plate which is perforated by a plurality of very small openings which are designed to condense and hold the oil in the first chamber 81 while allowing the passage of the cleaned air to the outlet 84. A metal plate having myriad openings of a diameter of about 0.010 (ten thousandths) of an inch is suitable for the purpose. The plate 82 could also take the form of a porous fabric or a sheet of filtering medium.

Also in accordance with the present invention, the axial support shaft 20 is sealed to each of the end plate 26 and the valve plate 54. As best seen in FIG. 3, the seals 87, 88 may take the form of resilient O-rings which are held in cutouts in the end plate and the valve plate respectively. The seals thus prevent any oil from leaking from the filtering pad 64 outwardly along the shaft 20 in either direction.

FIG. 4 illustrates an embodiment of the oil recovery system which further includes an annular brush 90 positioned to extend between the outer free end of the cowling sleeve 66 and the cover plate 52 of the turret. The brush 90 serves to prevent the entry of debris, such as shell fragments, from entering between the gasket 75 and the end plate, and it is supported by a metal retainer 91 which is crimped to retain the brush and secured to the cowling sleeve 66.

FIG. 5 illustrates an embodiment wherein the annular barrier member comprises an annular elastomeric band 92 which is sized to overlie and be supported on the outer periphery of the cover plate 52 so as to be aligned with the end plate 26. The band 92 acts as a slinger during rotation of the turret to throw any oil running along the inside of the end plate onto the cowling sleeve 66, as indicated by the arrow. Also, the free end of the cowling sleeve incorporates an annular end dam 93 which prevents the oil in the collection chamber 76 from flowing out and thereby assures that the oil enters the drain.

FIG. 6 illustrates an embodiment wherein the outer periphery of the end plate 26' incorporates integral grooves 95 which act as slingers in the manner described above, and a sealing member in the form of a vinyl coated sponge rubber ring 96 is mounted so as to encircle the cover plate 52 adjacent the end plate 26'. The ring has a generally circular cross section, and a vinyl clip 97 is mounted at the free end of the cowling sleeve 66 to engage the ring, which rotates with the turret 22, and thereby minimize friction. The ring 96 thereby essentially closes the collection chamber 76, so that the oil which is thrown onto the cowling sleeve is retained thereon until it passes into the drain. In this embodiment, the drain passes radially through the cowling sleeve 66.

In the drawings and specification, there have been set forth preferred embodiments of the invention, and although specific terms are employed, they are used in a generic and descriptive sense only, and not for purposes of limitation.

That which is claimed:

1. A high production nutcracking apparatus comprising
a turret mounted on a machine frame for rotation about a horizontal axis, said turret comprising a plurality of cracking units which are uniformly spaced about the periphery of the turret, and an end plate disposed perpendicularly to said axis and located so that the cracking units are on one side of said end plate, with each of the cracking units comprising an anvil and a cracking shuttle which are moveable toward and away from each other by pressurized air which is admitted into and exhausted from the units via a plurality of ports formed in the units, and with the ports being connected to said one side of the end plate and so as to communicate with respective openings which extend through the end plate,
a valve plate fixedly mounted to the machine frame so as to be positioned parallel to and spaced from the other side of the end plate, said valve plate including a plurality of inlet openings which are positioned for sequential alignment with selected ones of the openings in the end plate as the turret is rotated, and with the inlet openings each communicating with an air delivery line on the side thereof opposite the end plate, and said valve plate further including at least one outlet opening positioned for sequential alignment with selected ones of the openings in the end plate as the turret is rotated, and with the outlet opening in said valve plate being connected to an exhaust line on the side thereof opposite the end plate,
an air delivery system for delivering pressurized air which includes an oil mist component to each of said air delivery lines such that the pressurized air is selectively delivered to and exhausted from said cracking units during rotation of the turret,
a filtering pad fixedly mounted in the space between said end plate and said valve plate, with said filtering pad having a plurality of inlet openings aligned with respective ones of the inlet openings in said valve plate, and at least one outlet opening which is aligned with the outlet opening in said valve plate, and with the filtering pad forming a filtering barrier which is aligned with at least some of the openings in the end plate when such openings receive exhausted air from the associated cracking unit, an oil recovery system for recovering oil from the pressurized air after it has been delivered to and exhausted from the cracking units comprising (a) a cowling sleeve attached to said valve plate so as to surround the radial periphery of the end plate and the filtering pad, said cowling sleeve having an annular free end remote from said valve plate and defining an annular collection chamber surrounding the periphery of said filtering pad and said end plate, a drain communicating with the lower portion of said collection chamber, and an annular barrier member for restricting the flow of oil which is received in the collection chamber in a direction toward said free end of the cowling sleeve and so that the oil is guided into said drain, (b) an oil tank for receiving any oil exiting from said drain of the collection chamber and from the exhaust line which is connected to the outlet opening of the valve plate, and (c) an oil recirculation system for delivering oil from the tank to the air delivery system to form the oil mist component of the pressurized air delivered to the cracking units.

2. The apparatus as defined in claim 1 wherein the oil tank has a first upper chamber communicating with the drain and with said exhaust line, a second upper chamber communicating with an outlet line, a lower oil delivery line communicating with said oil recirculation system, and an air porous baffle plate positioned to extend downwardly into oil in the tank and separating the first and second upper chambers from each other.

3. The apparatus as defined in claim 1 wherein said turret further includes an axial support shaft extending along said horizontal axis, with said shaft extending through aligned openings in said end plate, said filtering pad, and said valve plate, and including a resilient sealing gasket disposed between said shaft and each of said end plate and said valve plate.

4. The apparatus as defined in claim 1 wherein the annular barrier member comprises a resilient annular gasket positioned to extend between the cowling sleeve and the outer periphery of the end plate or a turret cover plate which encircles the outer periphery of the end plate.

5. The apparatus as defined in claim 4 wherein the resilient annular gasket is configured to generally seal the collection chamber to the passage of air and so that the chamber becomes somewhat pressurized by the air which enters and exhausts from the cracking units and then passes through the filtering pad to the collection chamber.

6. The apparatus as defined in claim 5 wherein the barrier member further comprises an annular brush positioned immediately adjacent the free end of the cowling plate and extending at least substantially between the cowling member and the outer periphery of the end plate or a turret cover plate which encircles the outer periphery of the end plate.

7. The apparatus as defined in claim 1 wherein said barrier member comprises an annular shoulder positioned on the outer periphery of the end plate so as to radially sling onto the cowling sleeve any oil moving along the outer periphery of the end plate and toward the free end of the cowling plate.

8. The apparatus as defined in claim 7 wherein the annular shoulder comprises a resilient annular ring which is secured about the outer periphery of the end plate or about the outer periphery of a turret cover plate which encircles the outer periphery of the end plate.

9. The apparatus as defined in claim 8 wherein the barrier member further comprises an annular dam extending from the cowling sleeve radially toward said turret.

10. The apparatus as defined in claim 1 where in the barrier member comprises a resilient annular ring of generally circular cross section mounted about the outer periphery of the end plate or a turret cover plate which encircles the outer periphery of the end plate, with the ring being positioned to engage the annular free end of the cowling sleeve.

11. The apparatus as defined in claim 10 wherein the annular free end of the cowling sleeve mounts a plastic clip which engages the annular ring with minimal friction.

12. The apparatus as defined in claim 1 wherein the barrier member includes an annular dam extending from a location adjacent the free end of the cowling sleeve radially toward said turret.

13. A high production nutcracking apparatus comprising a turret mounted on a machine frame for rotation about a horizontal axis, said turret comprising a plurality of cracking units which are uniformly spaced about the periphery of the turret, and an end plate disposed perpendicularly to said axis and located so that the cracking units are on one side of said end plate, with each of the cracking units comprising an anvil and a cracking shuttle which are moveable toward and away from each other by pressurized air which is admitted into and exhausted from the units via a plurality of ports formed in the units, and with the ports being connected to said one side of the end plate and so as to communicate with respective openings which extend through the end plate, a valve plate fixedly mounted to the machine frame so as to be positioned parallel to and spaced from the other side of the end plate, said valve plate including a plurality of inlet openings which are positioned for sequential alignment with selected ones of the openings in the end plate as the turret is rotated, and with the inlet openings each communicating with an air delivery line on the side thereof opposite the end plate, and said valve plate further including at least one outlet opening positioned for sequential alignment with selected ones of the openings in the end plate as the turret is rotated, and with the outlet opening in said valve plate being connected to an exhaust line on the side thereof opposite the end plate, an air delivery system for delivering pressurized air which includes an oil mist component to each of said air delivery lines such that the pressurized air is selectively delivered to and exhausted from said cracking units during rotation of the turret, a filtering pad fixedly mounted in the space between said end plate and said valve plate, with said filtering pad having a plurality of inlet openings aligned with respective ones of the inlet openings in said valve plate, and at least one outlet opening which is aligned with the outlet opening in said valve plate, and with the filtering pad forming a filtering barrier which is aligned with at least some of the openings in the end plate when such openings receive exhausted air from the associated cracking unit, an oil recovery system for recovering oil from the pressurized air after it has been delivered to and exhausted from the cracking units comprising (a) a cowling sleeve attached to said valve plate so as to surround the radial periphery of the end plate and the filtering pad, said cowling sleeve defining an annular collection chamber surrounding the periphery of said filtering pad and said end plate, and a drain communicating with the lower portion of said collection chamber, (b) an oil tank for receiving any oil exiting from said drain of the collection chamber and from the exhaust line which is connected to the outlet opening of the valve plate, said oil tank comprising a first upper chamber communicating with the drain and with said exhaust line, a second upper chamber communicating with an outlet line, a lower oil delivery line, and an air porous baffle plate positioned to extend downwardly into oil in the tank and separating the first and second upper chambers from each other, and (c) an oil recirculation system including a pump for delivering oil from the lower oil delivery line of the tank to the air delivery system to form the oil mist component of the pressurized air delivered to the cracking units.

14. The apparatus as defined in claim 13 wherein said apparatus further comprises an air vacuum system for exhausting air and any entrained debris from the vicinity of the turret, and wherein the outlet line of the oil tank is connected to said air vacuum system.

* * * * *